United States Patent [19]
Green

[11] 3,866,949
[45] Feb. 18, 1975

[54] SAFETY COVER FOR A BUMPER HITCH

[76] Inventor: John R. Green, 1047 N. Estelle, Wichita, Kans. 67214

[22] Filed: July 16, 1973

[21] Appl. No.: 379,714

[52] U.S. Cl. .............................................. 280/507
[51] Int. Cl. ............................................ B60d 1/06
[58] Field of Search .......... 280/495, 511, 507, 500; 293/69 R

[56] References Cited
UNITED STATES PATENTS
2,576,461  11/1951  Kammerer ..................... 280/511 X
3,606,385   9/1971  Johannes ....................... 280/500 X FOREIGN PATENTS OR APPLICATIONS
707,052   4/1954   England ............................ 280/500

Primary Examiner—Stanley H. Tollberg
Assistant Examiner—Norman L. Stack, Jr.
Attorney, Agent, or Firm—John H. Widdowson

[57] ABSTRACT

A safety cover for a bumper hitch connected to a bumper comprising a cover member attached to the bumper for confining the bumper hitch. The cover member includes exterior surfaces that collimate and align with the exterior surfaces of the bumper when attached thereto. The bumper includes an indented recess with an open top and an open front and the bumper hitch is positioned on the bottom of the recess. A step plate member having at least one L-shaped support member is pivotally connected to the bumper such that when the step plate is pivoted to rest on the bumper, a structural portion of the step plate closely shelters part of the cover member to rigidly hold the cover member in an encompassing position with respect to the recess.

7 Claims, 4 Drawing Figures

PATENTED FEB 18 1975　　3,866,949
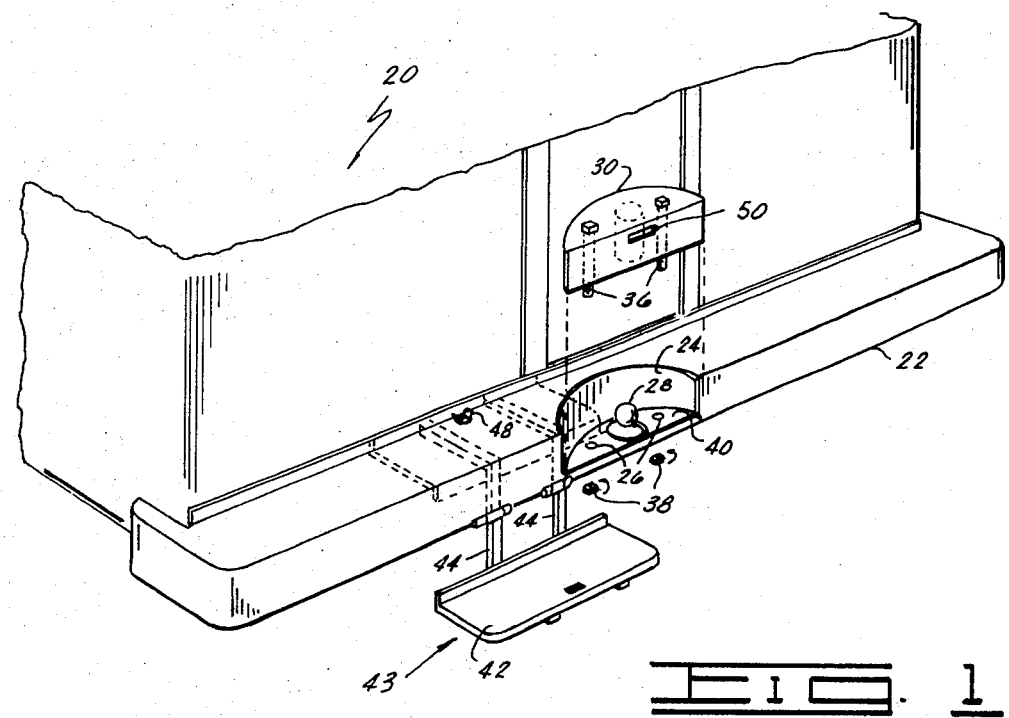
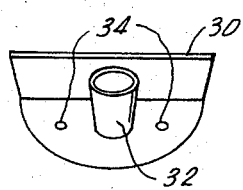
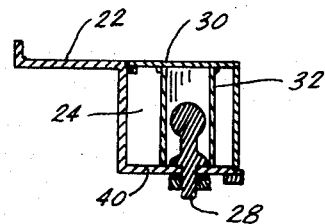
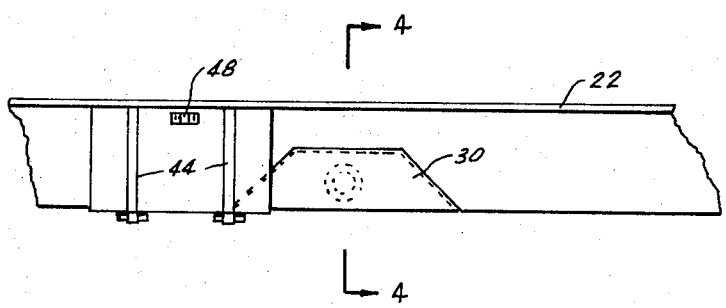

SAFETY COVER FOR A BUMPER HITCH

BACKGROUND OF THE INVENTION

1. Field of the Invention

This invention is related to a safety cover for a bumper hitch. More specifically, this invention provides a cover member for a bumper hitch which includes exterior surfaces that are aligned with the exterior surfaces of the bumper when attached thereto.

2. Description of the Prior Art

Conventional safety covers for bumpers hitches do not have exterior surfaces that collimate with the exterior surfaces of the bumper to camouflage the bumper to an extent that without scrutiny, the safety cover cannot be seen. The bumper hitches are usually permanently affixed to the rear bumpers of automobiles, pick-up trucks, station wagons, and the like, and constitute a safety hazard in addition to the protruding and unartistic appearance. In attempting to solve the problems associated by such bumper hitches, the prior art hitches have included a drawbar pivotally mounted within a recess in the bumper for swinging movement between a draft position outwardly extended from the bumper and a position within the drawbar fully retracted within the recess in the bumper. The prior art has also presented trailer hitches with retractable guards which correct the safety hazard without regard to the obtrusive appearance. These devices besides being cumbersome and difficult to install, are relatively expensive and are unfit for campers and pick-up trucks where a person frequently utilizes the rear bumper as a foot support. Therefore, what is needed and what has been invented by me is a novel safety cover for a bumper hitch without the foregoing deficiencies associated with the prior art.

SUMMARY OF THE INVENTION

The present invention accomplishes its desired objects by broadly providing a safety cover for a bumper hitch connected to a bumper including a cover member to confine the bumper hitch in an indented recess within the bumper, and means for securing the cover member to the bumper. The cover member includes exterior surfaces which collimate and align with the exterior surfaces of the bumper when attached thereto. Means for securing comprises a nut and bolt combination, or means for enclosing the bumper hitch which is attached to the cover member and closely conforms to the structural shape of the bumper hitch to prevent slippage of the cover member. Means for securing the cover member to the bumper may additionally include stepping means having a step plate member and at least one generally L-shaped support member pivotally connected to the bumper such that when the step plate member is pivoted to rest on the bumper, a structural member is pivoted to rest on the bumper, a structural portion of the step plate member closely shelters part of the cover member to rigidly hold the cover member in an encompassing position as respect to the indented recess within the bumper. The indented recess includes an open top and an open front.

It is therefore an object of the present invention to provide a safety cover for a bumper hitch whose exterior surfaces are aligned with the exterior surfaces of the bumper when attached thereto.

It is another object of this invention to provide a safety cover for a bumper hitch which is especially suited for bumpers which are frequently to be used as a step.

It is yet another object of this invention to provide a safety cover which is aesthetically pleasing when attached to the bumper, relatively economical to manufacture, and can be quickly installed with the least amount of effort.

These, together with various ancillary objects and features which will become apparent as the following description proceeds are obtained by this novel safety cover for a bumper hitch, a preferred embodiment is shown in the accompanying drawings, by way of example only, wherein:

BRIEF DESCRIPTION OF THE DRAWINGS

FIG. 1 is a fragmentary perspective view of the back of a camper including a bumper having a step member pivotally connected thereto, a bumper hitch situated in an indented recess within the bumper, and a semi-circular shaped cover member for covering the hitch in the recess;

FIG. 2 is a perspective view of the semi-circular shaped cover member in an inverted position;

FIG. 3 is a partial top plan view having a trapezoidal shaped cover member enclosing the hitch and secured to the bumper by the step member pivoted and partially resting on the top structure of the cover member;

FIG. 4 is a vertical sectional view taken along the plane and in direction of the arrows of line 4—4 of FIG. 3.

DETAILED DESCRIPTION OF THE INVENTION

Referring in detail now to the drawings, wherein similar or like parts of the invention are identified by like reference numerals, there is seen, particularly in FIG. 1, the rear of a camper, generally illustrated at 20, having a bumper 22 with an indented recess 24 including an open top and an open front. Recess 24 has a bottom 40 upon which a bumper hitch 28 is positioned. Open top, open front, and bottom 40 of recess 24 may delineate any suitable shape, but they are preferably geometrically shaped for aesthetics. In a preferred embodiment of the invention, open front is generally rectangularly shaped, and open top and bottom 40 may delineate a semi-circle as disclosed in FIGS. 1 and 2, or a trapezoid as disclosed in FIG. 3. Bumper hitch 28 may be any suitable hitch, connecting mechanism, or the like, but is preferably a trailer ball bumper hitch.

A cover member 30 is provided for confining and encompassing hitch 28 within indented recess 24. Cover member 30 includes a rectangular shaped aperture 50 which enables cover member 30 to be easily lifted from encompassed recess 24. Cover 30 is generally a L-shaped plate having a back with essentially the same surface area and configuration as the open front of indented recess 24, and a base including generally also the same surface area and configuration as open top of recess 24. Since, as was previously mentioned, open front is preferably rectangular, and open top and bottom 40 are preferably either semi-circular or trapezoidal, then the back and base of L-shaped cover 30 should be rectangular, and semi-circular or trapezoidal, respectively. If open top and bottom 40 of recess 24 are semi-circular as well as the base of L-shaped cover member 30, then the radius of semi-circular base would be approximately the identical radius as the open top and bottom 40.

When cover member 30 is attached to bumper 22 to confine bumper hitch 28 and encompass recess 24, the exterior surfaces of cover member 30 collimate and align with the exterior surfaces of bumper 22. I have discovered at least three possible means of securing cover member 30 to bumper 22. One means would be to intially bore apertures 34 and 26 into cover 30 and recess 24, respectively, and to subsequently insert bolts 36 therethrough for affixation by nuts 38 under bottom 40 of recess 24. Another means would be to pivotally attach a stepping means, generally illustrated as 43, to bumper 22 in proximity to recess 24 such that when stepping means 43 is pivoted to rest on bumper 22, as disclosed in FIG. 3, a structural portion of stepping means 43 closely shelters part of the top of cover member 30 to rigidly hold the cover member in the encompassing position with respect to recess 24. Stepping means 43 preferably comprises a step plate member 42 and generally L-shaped support members 44 which are pivotally attached to bumper 22 at the uppermost portion of their backs. L-shaped support members have a base which abuts the centermost portion of step plate 42 and connect to the bottom thereof. A portion of step plate 42 secures cover 30 to bumpers 22 when a locking mechanism 48 attached to bumper 22 secures plate 42 in a prostrate position with respect to the top of bumper 22. The preferred means to secure cover 30 to bumper 22 is to attach to cover member 30 an enclosing means 32 for enclosing bumper hitch 28. Enclosing means 32 should closely conform to the structural shape of bumper hitch 28 to prevent slippage of the cover member 30 from recess 24 and bumper 22. Preferably, since the preferred bumper hitch 28 is a trailer ball type of hitch, the enclosing means is a tubular member 32 having a diameter slightly larger than the diameter of the trailer ball. Tubular members 32 is clearly shown in FIGS. 2 and 4.

In operation of the invention, the removal of cover 30 from recess 24 depends on which one of the securing means has been utilized to secure cover 30 to bumper 22. If stepping means 43 was used, then latching mechanism 48 is unhooked and step plate 42 is lifted up and pivoted downwardly from bumper 22 where it partially covered the top of cover 30. Cover 30 may now be easily removed from recess 24 by inserting fingers of a hand (not shown in the drawings) into aperture 50 and lifting. If the nut and bolt combination was used for securing cover 30 to bumper 22, then cover 30 is released by merely unscrewing nuts 38 from underneath bottom 40 of recess 24 and removing the bolts 36. As aforementioned, the preferred embodiment for securing cover 30 to bumper 22 is to utilize a tubular member 32 attached to cover 30 which closely surrounds trailer ball hitch 28 to prevent horizontal or downward slippage. When this embodiment is used for securing cover 30 to bumper 22, cover 30 is removed from recess 24 by merely lifting essentially directly upward with the aid of aperture 50 as was previously mentioned.

After cover member 30 has been removed, trailer ball hitch is exposed for attaching a trailer (not shown in the drawings) or the like. It should be noted that after removal of cover 30 and prior to or after attaching the trailer stepping means 43 may be pivoted back to the prostrate position with respect to the top of bumper 22 and secured by latching mechanism 48. This enables stepping means 43 to be protected while traveling and towing the trailer.

When the towing operation is completed and the desired location has been reached, the trailer is unhooked and cover member 30 may be placed back in the position encompassing indented recess 24 and secured to bumper 22 by one of the three earlier mentioned securing means. This collimates the exterior surfaces of cover member 30 with the exterior surfaces of bumper 22 and enables bumper 22 to be easily used as a step without being concerned with twisting or breaking an ankle resulting from a foot slipping into recess 24.

While the present invention has been described herein with reference to particular embodiments thereof, a latitude of modification, various changes and substitutions are intended in the foregoing disclosure, and in some instances some features of the invention will be employed without a corresponding use of other features without departing from the scope of the invention as set forth.

I claim:

1. A safety cover for a bumper hitch connected to a bumper having an indented recess with an open top and an open front with said bumper hitch being positioned on the bottom of said recess, comprising:
   a. a cover member to confine said bumper hitch,
   b. means for stepping pivotally attached to said bumper in proximity to said recess and having means for securing said cover member when mounted on said bumper and pivoted to rest on said bumper comprising, a step plate member, at least one generally L-shaped support member, said L-shaped support member including a back having the uppermost portion thereof pivotally connected to said bumper and a base abutting the centermost portion of said step plate member and connected to the bottom thereof, said step plate member having a portion closely sheltering part of said cover member to hold said cover member in an encompassing position with respect to said recess when pivoted to rest on said bumper, and
   c. said cover member including exterior surfaces that collimate and align with the exterior surfaces of said bumper when attached thereto.

2. The safety cover of claim 1 wherein said means of securing comprises means for enclosing said bumper hitch, said means for enclosing being attached to said cover member and closely conforming to the structural shape of said bumper hitch to prevent slippage of said cover member.

3. The safety cover of claim 2 wherein said cover member includes a structure defining at least one first aperture, said recess including at least one second aperture, and said means for securing comprises at least one nut and bolt combination, said bolt extending through said first and said second aperture and fastened therein by said nut.

4. The safety cover of claim 3 wherein said cover member additionally comprises a structure having at least one-third aperture, said third aperture is generally rectangular and enables said cover member to be easily lifted from said encompassed recess.

5. A safety cover for a bumper hitch connected to a bumper having an indented recess with an open top and an open front with said bumper hitch positioned in said recess on the bottom of said recess, comprising:

a. a cover member to confine said bumper hitch, said cover member including exterior surfaces that collimate and align with the exterior surfaces of said bumper when mounted thereon, b. means for securing said cover member to said bumper comprising means for enclosing said bumper hitch, said means for enclosing being attached to said cover member and closely conforming to the structural shape of said bumper hitch to prevent slippage of said cover member, c. said open top and said bottom of said recess delinate a semi-circle, said open front of said recess defines a rectangular opening, and d. said cover member is generally an L-shaped plate including a rectangular back and having an area essentially that of said rectangular opening and a semi-circular base with approximately the identical radius as said open top and said bottom of said recess.

6. The safety cover of claim 5 wherein said bumper hitch is a trailer ball bumper hitch and said means for enclosing said trailer ball bumper hitch is a tubular member having a diameter slightly larger than the diameter of said trailer ball bumper hitch.

7. The safety cover of claim 5 wherein said open top and said bottom of said recess delineate a trapezoid and said L-shaped plate comprises a trapezoidal shaped base with approximately the same surface area as said open top and said bottom of said recess.

* * * * *